No. 890,981. PATENTED JUNE 16, 1908.
R. HERMAN.
SUSPENSION FRAME FOR AUTOMOBILES.
APPLICATION FILED APR. 25, 1906.
3 SHEETS—SHEET 1.
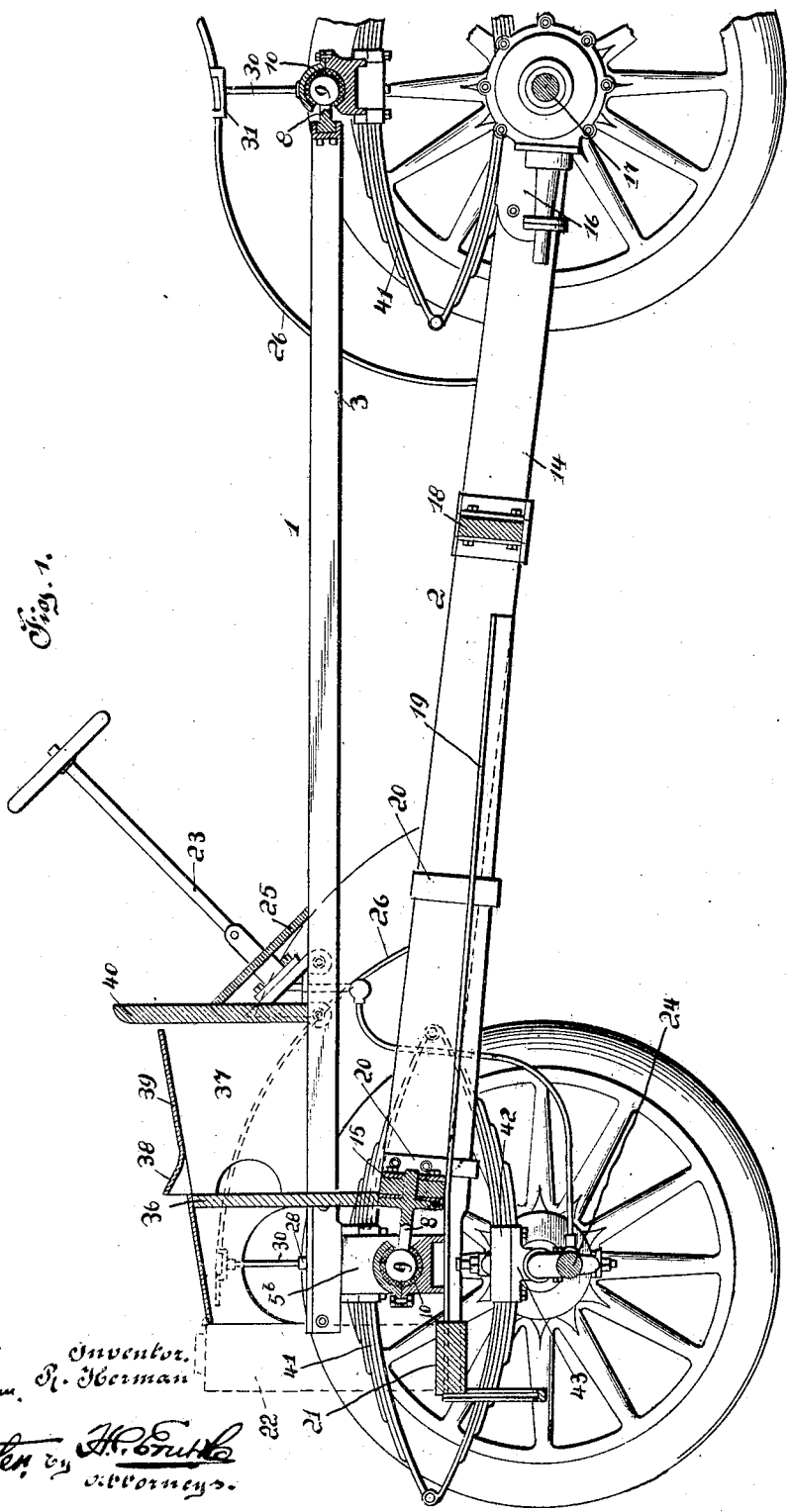

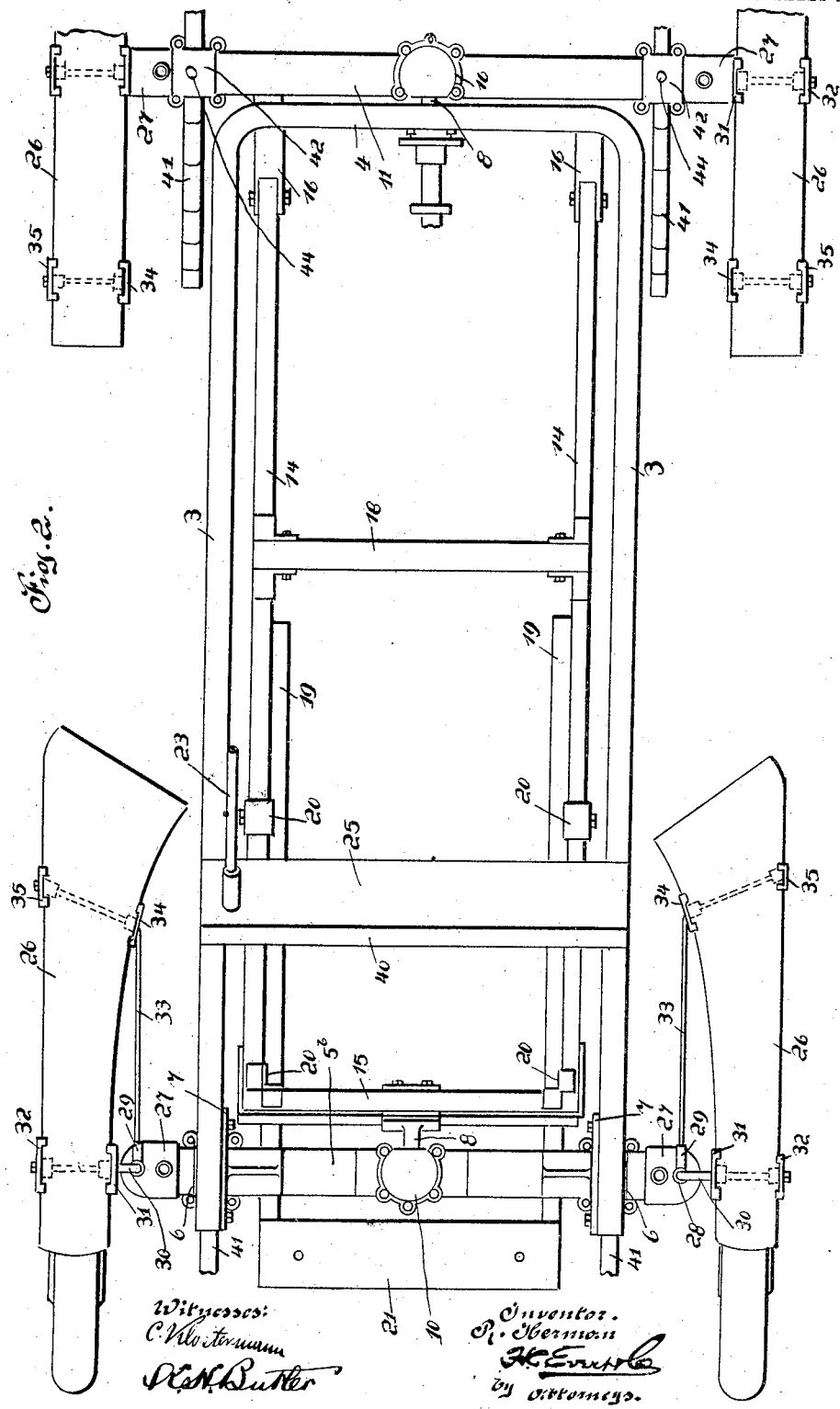

No. 890,981. PATENTED JUNE 16, 1908.
R. HERMAN.
SUSPENSION FRAME FOR AUTOMOBILES.
APPLICATION FILED APR. 25, 1906.
3 SHEETS—SHEET 3.
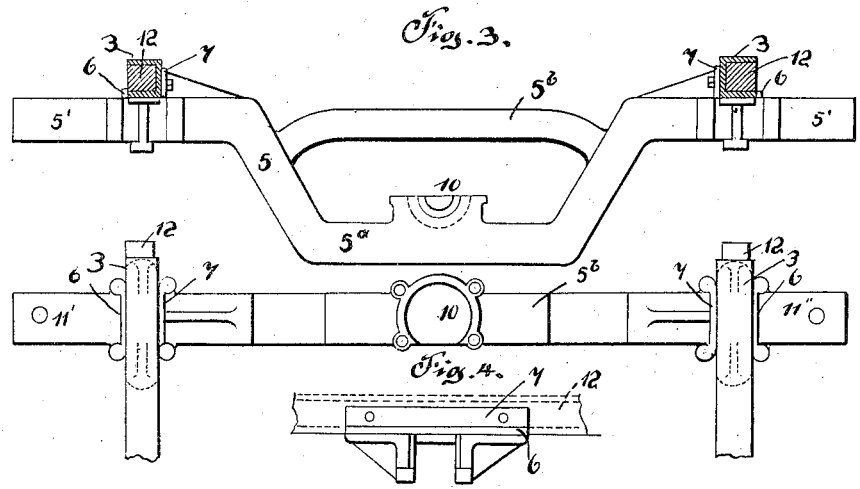
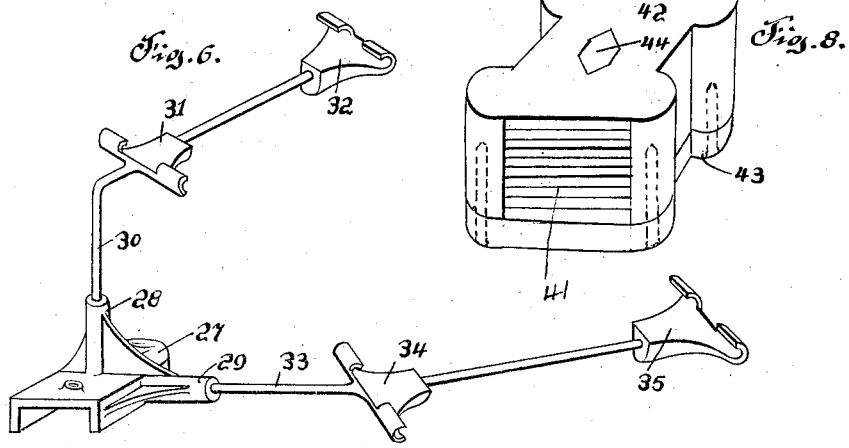
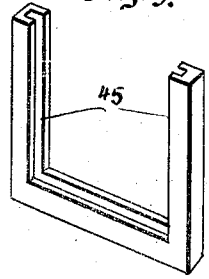
Witnesses:
A. H. Rabsaig
J. H. Butler
Inventor.
R. Herman.
by
Attorneys.

UNITED STATES PATENT OFFICE.

REINHOLD HERMAN, OF CRAFTON, PENNSYLVANIA.

SUSPENSION-FRAME FOR AUTOMOBILES.

No. 890,981.            Specification of Letters Patent.            Patented June 16, 1908.

Application filed April 25, 1906. Serial No. 313,525.

*To all whom it may concern:*

Be it known that I, REINHOLD HERMAN, a citizen of the United States of America, residing at Crafton, in the county of Allegheny and State of Pennsylvania, have invented certain new and useful Improvements in Suspension-Frames for Automobiles, of which the following is a specification, reference being had therein to the accompanying drawing.

This invention relates to motor-vehicles of the four-wheel driven type, and the invention has for one of its main objects to provide means whereby either axle of the vehicle is permitted to rock freely in a vertical plane to conform to inequalities in the surface of the road over which the vehicle is traveling, and to further provide means whereby the motor which is arranged at the front of the vehicle is so supported from the rear axle as to overcome the jolting or jarring thereof when the front wheels of the vehicle meet with an obstruction or travel over uneven surfaces of a road bed.

A further object of the invention is to set up front and rear fenders or guards so that the former will move in unison with the front axle and the latter will have a like movement with respect to the rear axle, such manner of setting up the fenders will cause them to permanently remain in their operative position, irrespective of the movement of the axles when the vehicle meets with an obstruction or is traveling over an uneven road bed.

A further object of the invention is to provide the suspension frame or chassis of two frame members one of which is independently movable with respect to the other and is adapted to support the steering gear and the other of which is adapted to support the motor, and by such arrangement the jarring of the motor when the front of the vehicle travels over an obstruction is overcome and the jarring of the steering gear is prevented when the rear portion of the vehicle meets with an obstruction.

Another object of my invention is to provide a suspension frame or chassis with novel means for connecting the same to the bolsters of the vehicle, and novel means for supporting the motor from the suspension frame.

Still further objects of my invention are to provide improved means for supporting the steering gear from the suspension-frame; improved means for supporting the radiator from the suspension-frame; improved means for supporting the fenders or wheel-guards in such a manner that the same may be readily detached if desired, or in case a fender or guard is broken, the same may be easily and quickly removed from its supporting bracket without necessitating the removal of such bracket from the frame; and improved means for preventing the air after it has passed the radiator and become heated, from being brought into contact with the engine.

My invention has for its further object improvements in connection with various parts of the vehicle, all of which will be hereinafter specifically described and then particularly pointed out in the claims.

In the accompanying drawings: Figure 1, is a central longitudinal sectional view through an automobile frame constructed in accordance with my invention, the view being partly broken away, Fig. 2, is a top plan view, Fig. 3, is a cross sectional view through the upper frame member, showing the front bolster in elevation, Fig. 4, is a top plan view of the front bolster, showing a part of the reach-rods or side-rails of the upper frame-member, Fig. 5, is an end view of the front bolster, Fig. 6, is a detached perspective view of the supporting bracket for the fenders or wheel-guards, Fig. 7, is a perspective view of the socket-member employed for connecting the rear ends of the side-rails of the lower frame member to the rear axle of the vehicle, showing said axle broken away, Fig. 8, is a detached detail perspective view of the spring-holding clamp, and Fig. 9, is a detached detail perspective view of a license plate holder.

The principle involved in the present invention in so far as the feature of connecting the suspension-frame to the bolsters is concerned, is analogous to that shown and described in an application filed by me December 15th, 1905, Serial No. 291,876. In the present invention, however, improvements reside in the specific manner of connecting the frame-members to the bolster, the specific structure of the frame-member, and the specific structure of the bolsters, as well as other features of improvement which will appear as the description proceeds.

The suspension-frame in the present application involves what I term an upper frame member 1 and a lower frame-member 2. The upper frame-member at its forward end is rigidly connected to the front bolster of the vehicle, while at its rear end, it is so connected that the bolster may move without imparting movement to the frame-member. The lower frame-member is connected at its forward end in a manner similar to that of the connection between the upper frame-member and rear bolster, and the rear end of the lower frame-member is rigidly connected to the rear axle of the vehicle.

In practice, I have found it advantageous to construct the upper frame-member of metal, preferably steel, and I have advantageously employed structural steel in the form of a channel bar. The bar is bent to form the two parallel side-bars or reach-rods 3 connected together at their rear ends by the cross piece 4. These bars adjacent their forward ends rest on the front bolster 5, between flanges 6, and 7 carried by said bolster, and preferably, though not essentially, formed integral therewith. In practice, I have found it advantageous to construct the front bolster with the flanges 6, 7, integral therewith, though it will be observed that a separate clamp might readily be employed on the bolster to receive the side-bars, such clamp being independent of the bolster, without departing from the spirit of the invention.

In order to bring that portion of the front and rear bolsters on which the respective frame-members bear, on substantially the same plane, and yet permit of trunnioning the two frame-members into the bolsters, I form the front bolster 5 with a drop 5ª, which carries the bearing for the trunnion, as clearly seen in Figs. 3 and 4, bracing the upwardly extending sides of the drop with a cross bar or brace 5ᵇ.

The cross-head or bar 4, which connects the two side-bars at their rear end, is provided centrally of its length with a trunnion 8, the form of trunnion preferably used by me having a ball 9 on the end which is received in, and works in, the socket 10, carried by the bolster 11. The advantageous construction of this socket is one in which one socket member is integral with the bolster, and the other socket-member is in the form of a cap-plate, the two members being connected together by bolts in the usual manner. I employ, of course, a suitable bearing metal within the socket for the ball to work in.

It will be understood that the vehicle body is supported on the upper frame-member, and I have found that in practice, where this frame-member is constructed alone of steel, that the vibrations thereof are imparted to the vehicle body. In my present invention, I have provided means whereby the advantages derived from a steel frame-member may be retained, and at the same time, the vibrations thereof absorbed to a very material extent. It is for this reason that I prefer to construct the upper frame-member of structural steel having the channel bar form as herein shown and as afore stated, as this form of bar enables me to place therein a bar of wood 12, which tends to absorb the vibrations imparted to the frame-member, and thus reduce them in the vehicle body. The lower frame-member 2 also comprises parallel side bars connected together at their forward ends by a cross-head. These bars I preferably construct of wood, though I do not wish to confine myself to the use of this particular material. I have found it advantageous, however, as I am enabled to use a bar of wood of sufficient dimensions to obtain the desired results, and still have less weight than would be required if steel were used, and again, by the use of wood in the construction of the lower frame-member, less vibration occurs than would be the result if this frame-member were constructed of steel. The two parallel side-bars 14 of the lower frame-member are connected together at their forward end by a cross-head 15. This cross-head 15 carries a trunnion 8, the head 9 of which works in the socket 10 of the front bolster, this construction being similar to the connection between the rear end of the upper frame and the rear bolster.

At their rear ends the side-bars of the lower frame-member are received in and bolted or otherwise permanently fastened, to socket-members 16, which are sleeved on to the rear axle 17, as very clearly seen in Fig. 7 of the drawings. At any suitable and desirable point, between their ends, the side-bars of the lower frame-member may be braced by a cross-bar 18, this bar not only acting as a brace, but may also be employed as a guide for the driving-rod of the engine (not shown) as will be readily apparent.

The motor or engine (not shown) is supported from the lower frame-member, and I advantageously support such motor or engine by means of angle-iron bars 19, which rest against the inner faces of the side bars 14, and are suspended by means of clamps 20 hung on said bars 14. This mode of engine or motor support is important, as it will be understood that it is necessary to provide a considerable length of bearing for the motor. By hanging the bars 19 from the side-bars 14 with clamps as shown, I have a long bearing surface on which to support the motor, without necessitating bolting the bars 19 to the bars 14, at intervals throughout their length, as such construction would tend to weaken the bars 14. With the present constructions the clamps 20 being hung on the bars 14, it will only be necessary to pass one or more bolts through the bars 14 and clamps, in order to prevent the motor support from accidentally rising.

The motor supporting bars 19 are extended beyond the lower frame-member and beyond the front bolster, and fastened to the forward ends thereof is a support 21, on which the radiator 22 is mounted. The support 21 is also preferably formed of wood, as I have found that by this construction, I absorb considerable of the vibration and prevent same being imparted to the radiator.

With my improved chassis I support the steering gear from the upper frame-member, and it will be observed that by so doing, the said gear will necessarily have to move in conjunction with the front axle and consequently cannot operate to change the course of the car when in motion if the front axle should be thrown out of line by one of the front wheels dropping into a hole or being elevated above the other front wheel.

The steering-gear 23 shown conventionally in Fig. 1 is supported direct from the upper frame-member, instead of being carried by the vehicle body independently, of the frame-member, as in the usual construction. This steering-gear is connected up in any approved manner to the front axle of the vehicle, and by carrying same on the upper frame-member, I am enabled to much more readily disconnect the same should it be desired, than is possible where the steering gear is located in the vehicle body and carried thereby. In supporting the steering gear from the frame-member, the major portion thereof is brought above the frame-member and may be concealed by an inclined footboard 25 as shown.

In constructing the front bolster 5, and the rear bolster 11, I make the same of sufficient length so that the ends of said bolsters will project some distance beyond the suspension frame, as clearly shown by Figs. 2, 3, and 4 of the drawings. This is done in order to provide a support for the fenders or wheel-guards 26. This support comprises a clamp 27, flanged to fit and rest on the extending ends 5', 11' respectively of the bolsters. Each clamp is provided with vertically extending sockets 28, and a laterally extending socket 29. In the socket 28 is mounted and secured in any desired manner, an angular rod 30, on which is a stationary clip 31 and an adjustable clip 32. These clips 31, 32 are adapted to grip the edges of the fender 26 as clearly seen in Fig. 2 of the drawings. In the socket 29 is fitted a rod 33, also provided with a stationary clip 34, and an adjustable clip 35, said clips 34 and 35 gripping the edges of the fender as clearly seen in Fig. 2 of the drawings. The clamp 27 after being fitted on the extending end of the bolster, is bolted or otherwise held fast thereto, and it will be observed that by simply removing the bolt which holds said clamp, the entire support for the fender, together with the latter, may be readily and quickly detached from the vehicle. This is of great importance at times when replacing tires or performing other work around the wheels of the vehicle. It will also be observed that by simply loosening clips 32, 35, that the fenders may be removed at any time desired without removing the supports for said fenders.

As heretofore stated, one of the objects of the invention is to prevent the heated air from coming in contact with the engine, and the construction employed for this purpose will be apparent by reference to Fig. 1, wherein it will be observed I place a partition 36, between the radiator 22 and the engine (not shown), thus forming a chamber 37, within the hood 39, between the portion 36 and dash-board 40. The hood is provided with one or more openings 38 for the entrance of air into the chamber 37. By this construction it will be observed that all heated air from the radiator is prevented from passing to the engine, and when the car is in motion, cold air is taken through the openings 38 and delivered to the engine, and passed under the dash-board, thereby obtaining greater cooling effects.

The bolsters are, as will be understood, and as will be evident from inspection of the drawings, mounted on the springs 41, the latter being mounted on the front axle 24, and rear axle 17 respectively. In Fig. 8, I show in detail an improved means for securing the springs to the axles and reducing to a minimum the danger of their becoming loose, and also tending to prevent individual lateral movement of the several leaves of the springs. This means embodies a clamp-member 42 which fits over the spring, with a plate 43 fastened to the lower face of the member 42 by a plurality (preferably four) bolts tapped into the bosses of the member 42, a central bolt 44 is passed through the member 42, through the several leaves of the spring 41, and is tapped into the plate 43.

In Fig. 9 of the drawings, I show an improved form of license-plate holder which may be attached in any desired manner to any part of the vehicle, preferably to the supporting board of the radiator as shown. Owners of two or more automobiles frequently desire to change a license plate from one machine to another. Where this license plate is strapped onto the vehicle as is now the common practice, it is unhandy to remove. To obviate this, I provide a frame, built to the outline form of the license plate used. This frame 45 embodies simply two vertical grooved side-rails, and a grooved bottom rail, the same being open at the top to permit the ready insertion and removal of the license plate (not shown). A license plate may be readily removed from the holder on one machine and placed in the holder on another machine as desired.

Having fully described my invention, what

I claim as new and desire to secure by Letters Patent, is:—

1. An automobile comprising a front and rear axle, a bolster upon each of the axles, a pair of superposed frame members, the upper of which is fixedly connected to the front bolster and movably connected to the rear bolster and the lower of which is movably connected to the front bolster and fixedly connected to the rear axle and a motor supported from said lower frame member at the front thereof.

2. An automobile comprising a front and rear axle, a bolster upon each of the axles, a pair of superposed frame members, the upper of which is fixedly connected to the front bolster and movably connected to the rear bolster and the lower of which is movably connected to the front bolster and fixedly connected to the rear axle, a motor supported from said lower frame member and a hood supported from the lower frame member.

3. In an automobile comprising a front and rear axle each capable of rocking easily in a vertical plane so as to conform to the inequalities in the surface of the road bed over which the vehicle is traveling, front fenders or wheel guards connected to and moving in unison with the front axle, and rear fenders or wheel guards connected to and moving in unison with the rear axle.

4. An automobile comprising front and rear axles each capable of moving freely in a vertical plane, bolsters on each of said axles, front fenders or wheel guards connected to the front bolster and moving in unison with the front axle, and rear fenders or wheel guards connected to the rear bolster and moving in unison with the rear axle.

5. An automobile comprising a front and rear axle, each capable of moving freely in a vertical plane, a bolster on each of said axles, front fenders or wheel guards detachably connected to the front bolster and moving in unison with the front axle and rear fenders or wheel guards detachably connected to the rear bolster and moving in unison with the rear axle.

6. An automobile comprising a suspension frame formed of two superposed members, the upper of which is fixedly connected to the front bolster of the vehicle and movably connected to the rear bolster of the vehicle and the lower of which is movably connected to the front bolster of the vehicle and fixedly connected to the rear axle of the vehicle, a steering gear carried by the upper of said members, and a motor carried by the forward end of the lower of said members.

7. An automobile comprising a suspension frame formed of two superposed members, the upper of which is fixedly connected to the front bolster of the vehicle and movably connected to the rear bolster of the vehicle and the lower of which is movably connected to the front bolster of the vehicle and fixedly connected to the rear axle of the vehicle, a steering gear carried by the upper of said members, and a motor and a radiator carried by the lower of said members.

8. An automobile comprising two superposed frame members, axles, a bolster on each of the axles, the upper of said frame members fixedly connected to the front bolster and movably connected to the rear bolster, the lower of said frame members movably connected to the front bolster and fixedly connected to the rear axle, fenders or guards supported on the front bolster, fenders or guards supported on the rear bolster, a motor supported from the lower frame member, a steering gear supported from the upper frame member, the said upper frame member and parts carried thereby and the front fenders adapted to move independently of the lower frame member, and said rear fenders adapted to move in unison with the rear axle and lower frame member.

9. An automobile comprising a suspension frame formed of two sections one of which is movable independently of the other, front and rear bolsters, a ball and socket joint between one end of one of said members and the front bolster, and a ball and socket joint between one end of the other of said members and the rear bolster.

10. An automobile comprising a frame member, motor supporting bars carried by said member and extending beyond the front axle of the vehicle, and a radiator support carried by the forward ends of said bars.

11. An automobile comprising a suspension frame embodying an upper member formed of side rails connected together at one end, a steering gear carried by one of said side rails, a front and a rear bolster, means to swively connect said member to the rear bolster, means for rigidly connecting said member to the front bolster.

12. An automobile comprising a bolster, a frame member rigidly connected thereto, a second bolster, a swivel connection between the other end of said frame member and said second bolster, the ends of said bolsters projecting beyond the frame member, and fender supports detachably mounted on the extended ends of the bolsters.

13. An automobile comprising a front and rear axle, a bolster carried by each of the axles, a suspension frame formed of an upper and lower member, means for rigidly connecting the forward end of the upper member to the front bolster, means for swively connecting the rear end of the upper member to the rear bolster, means for swively connecting the rear end of the lower member to the front bolster, means for rigidly connecting the rear end of the lower member to the rear axle, the ends of said bolsters projecting beyond the suspension frame, and fender supports detachably mounted on said extended ends of the bolsters.

14. An automobile comprising a front and rear axle, a bolster carried by each of the axles, a suspension frame formed of an upper and lower member, means for rigidly connecting the forward end of the upper member to the front bolster, means for swivelly connecting the rear end of the upper member of the rear bolster, means for swivelly connecting the rear end of the lower member to the front bolster, means for rigidly connecting the rear end of the lower member to the rear axle, the ends of said bolsters projecting beyond the suspension frame, fender supports detachably mounted on said extended ends of the bolsters, a motor carried by said lower member at the front end thereof, and a steering gear carried by the upper of said members.

15. An automobile comprising a suspension frame, front and rear bolsters having their ends projecting from said frame, and their fender supports detachably connected to the extended ends of the bolsters.

16. An automobile comprising a suspension frame formed of two sections, one end of each of said sections being movably supported and the other of said sections being fixed, one of said sections arranged above the other, a motor and a hood and a radiator supported from the movable end of the lower of said sections, and a steering gear carried by the fixed end of the upper of said sections.

17. An automobile comprising two superposed frame members, a front and rear axle, bolsters on each of said axles, the upper of said frame members fixedly connected to the front bolster and movably connected to the rear bolster, the lower of said frame members movably connected to the front bolster and fixedly connected to the rear axle, fenders or guards detachably connected to each of said bolsters, a hood supported from the lower frame member, a steering gear supported from the upper frame member, the said frame member and parts carried thereby and the front fenders adapted to move independently of the lower frame member, and said rear fenders adapted to move in unison with the rear axle and lower frame member.

18. An automobile comprising a suspension frame, front and rear bolsters, and fenders or guards detachably connected to the bolsters.

19. An automobile comprising bolsters having extended ends, and fenders detachably connected to the extended ends of the bolsters.

20. An automobile comprising a suspension frame formed of two sections each of which is movable independently of the other, and a motor carried by one of said sections.

In testimony whereof I affix my signature in the presence of two witnesses.

REINHOLD HERMAN.

Witnesses:
A. M. WILSON,
E. E. POTTER.